March 9, 1926.

J. S. BOWEN

MAP HOLDER

Filed Oct. 20, 1925

1,576,028

Inventor

John S. Bowen

By O. E. Howe

Attorney

Patented Mar. 9, 1926.

1,576,028

UNITED STATES PATENT OFFICE.

JOHN S. BOWEN, OF BALDWIN PARK, CALIFORNIA.

MAP HOLDER.

Application filed October 20, 1925. Serial No. 63,726.

*To all whom it may concern:*

Be it known that I, JOHN S. BOWEN, citizen of the United States, residing at Baldwin Park, in the county of Los Angeles and State of California, have invented certain new and useful Improvements in a Map Holder, of which the following is a specification.

This invention relates to map holders and is especially adapted for attaching to an automobile in front of the driver so a map can readily be placed upon and be seen by the driver.

The principal object of this invention is to provide a device of this character which can readily be attached to the steering column or any other flat surface and which can support the map in a flat and satisfactory manner.

Another object of the invention is to provide a device of such character in which the map is attached to a cylinder and means to rotate the cylinder in order to bring before the driver any portion of the map.

Other objects will appear as the disclosure progresses. The drawings are intended merely to indicate a possible embodiment of the device. It is obvious that the actual needs of manufacture may necessitate certain mechanical changes. It is therefore not intended to limit the invention to the embodiment illustrated, but rather to define such limits in the appended claims.

For a more detailed understanding of the invention, attention is now called to the drawings in which a preferred embodiment is shown illustrated. In these drawings, like parts are designated by like reference characters in all the views.

Figure 1:
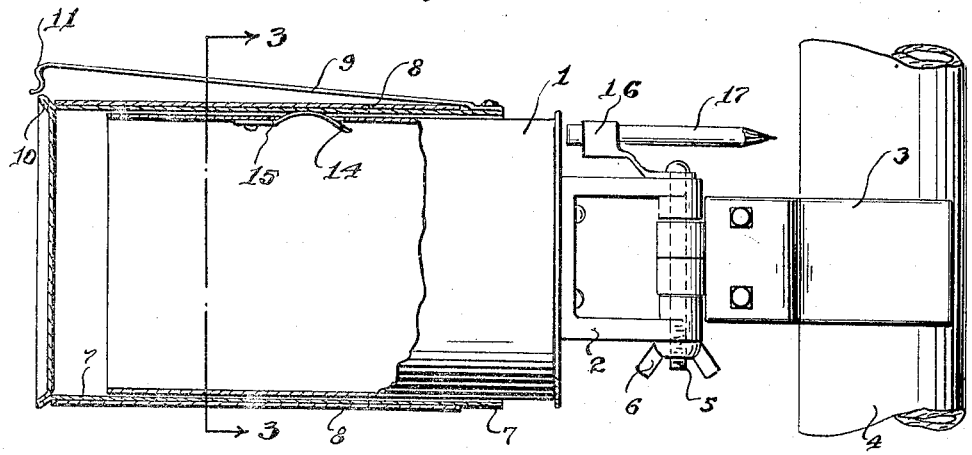
Fig. 1 is a side elevation of the map holder partly in section.
Figure 2:
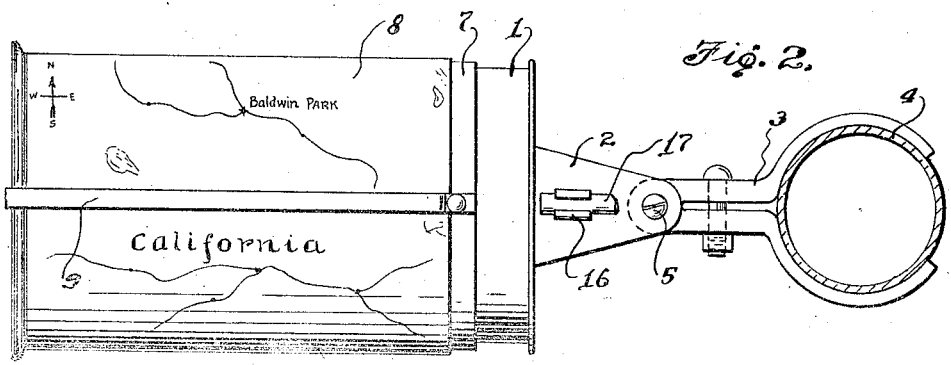
Fig. 2 is a top view thereof.
Figure 3:
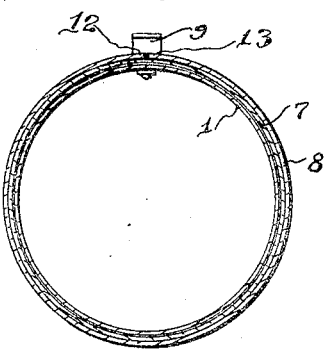
Fig. 3 is a section on line 3—3 of Fig. 1.

Referring now to the drawings in detail, numeral 1 designates a hollow inner cylinder being open at the outer end and 2 a bracket attached to the inner end of said cylinder. Numeral 3 represents a clamp fastened to the steering column 4 of an automobile and numeral 5 a pintle on which the bracket 2 swings. At the lower end of the pintle is a wing nut for securely fastening the bracket together and keep same from rotating.

Snugly fitting on the cylinder 1 is an outer hollow cylinder 7 on which the map is adapted to be placed and the joining ends of the map clamped to the cylinder by the spring clip 9. The outer end of the cylinder 7 is formed with an outward extending rim 10 which coacts with the bent portion 11 of the spring clip 9 for clamping the ends 12 and 13 of the map in place. In Fig. 1 the spring clip is shown in an unclamped position.

To prevent the outer cylinder from slipping off the inner cylinder due to vibration of the car, a spring 14 is provided. This spring through a slot 15 in the inner cylinder bears against the inner face of the outer cylinder and causes friction between the two cylinders. The outer cylinder supporting the map can be rotated and kept in any desired position due to the friction caused by the spring 14.

Attached to the bracket 2 at the top is a pencil holder 16 supporting a pencil 17.

Figure 4:
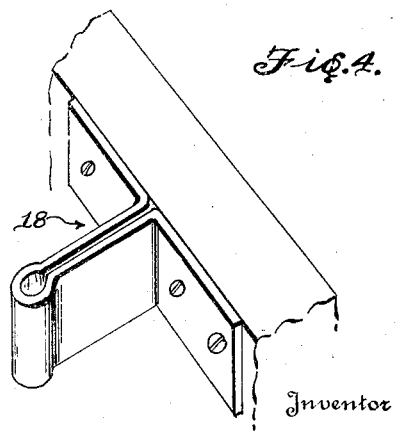
Fig. 4 is a modified form of the bracket support.

In Fig. 4 is shown a modified form of the bracket support 18. This bracket is used in place of the clamp 3 where there is a flat surface for attaching the bracket thereto, such as found in a closed car.

This device can be swung on the pintle 5 as its axis in any position which is convenient to the driver. The interior of the inner cylinder can be used as a storage place for the maps.

Having thus described my invention, I claim:

1. In a device of the class described in combination, an inner cylinder, an outer cylinder, the outer cylinder adapted to rotate on the inner cylinder, a bracket attached to the inner cylinder at one end, a clamp cooperating with the said bracket, the said bracket and inner cylinder adapted to swing on the said clamp.

2. In a device of the class described in combination an inner cylinder, an outer cylinder on which a map is adapted to be placed, a clip for clamping the map in place, the outer cylinder adapted to rotate on the inner cylinder, a bracket attached to the inner cylinder, a clamp, the said clamp and bracket cooperating so the said bracket and inner cylinder can swing, and means for fastening the said clamp and bracket together to prevent any swinging action.

3. In a device of the class described in combination, an inner cylinder, an outer cylinder on which a map is adapted to be placed, a spring clip for clamping the ends of the map on the outer cylinder, an outward extending rim on the outer cylinder, a bent down portion on the said spring clip for coacting with the said outward extending rim, the outer cylinder adapted to rotate on the inner cylinder, a spring to cause friction between the said cylinders in order to prevent the outer cylinder from slipping off the inner cylinder, a bracket attached to the inner cylinder, a clamp, the said clamp and bracket cooperating so the said bracket and inner cylinder can swing and means for fastening the said clamp and bracket together to prevent any swinging action.

In testimony whereof I affix my signature.

JOHN S. BOWEN.